United States Patent
Ooishi (10) Patent No.: US 10,021,252 B2
(45) Date of Patent: Jul. 10, 2018

(54) IMAGE READING DEVICE AND IMAGE FORMING SYSTEM

(71) Applicant: Konica Minolta, Inc., Tokyo (JP)

(72) Inventor: Akihiko Ooishi, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 10 days.

(21) Appl. No.: 15/442,881

(22) Filed: Feb. 27, 2017

(65) Prior Publication Data

US 2017/0279975 A1 Sep. 28, 2017

(30) Foreign Application Priority Data

Mar. 22, 2016 (JP) .................................. 2016-057111

(51) Int. Cl.
*H04N 1/04* (2006.01)
*H04N 1/00* (2006.01)

(52) U.S. Cl.
CPC ..... *H04N 1/00034* (2013.01); *H04N 1/00005* (2013.01); *H04N 1/00023* (2013.01); *H04N 1/00087* (2013.01); *H04N 1/00615* (2013.01); *H04N 2201/0081* (2013.01); *H04N 2201/0094* (2013.01)

(58) Field of Classification Search
CPC ........... H04N 1/00034; H04N 1/00005; H04N 1/00023; H04N 1/00087; H04N 1/00615

USPC .................................................. 358/518, 504
See application file for complete search history.

(56) References Cited

U.S. PATENT DOCUMENTS 9,838,568 B2 * 12/2017 Hayashi ............... H04N 1/6036

FOREIGN PATENT DOCUMENTS

JP 2007153580 A 6/2007

* cited by examiner

*Primary Examiner* — Houshang Safaipour
(74) *Attorney, Agent, or Firm* — Lucas & Mercanti, LLP (57) ABSTRACT

An image reading device includes: a scanner configured to read an image formed on a sheet of paper; a first background member configured to reflect light emitted from the scanner; a colorimeter configured to take a color measurement of the image; a second background member configured to reflect light emitted from the colorimeter; a guide member configured to guide the sheet of paper passing between the colorimeter and the second background member; and a regulating member configured to regulate movement of the sheet of paper, wherein the regulating member includes: a first member including a rolling member; a second member including a rolling member; and a pressing member configured to press the first member and the second member against the guide member, and the pressing member is disposed in a position offset from axes of the first member and the second member.

10 Claims, 9 Drawing Sheets

IMAGE READING DEVICE AND IMAGE FORMING SYSTEM

The entire disclosure of Japanese Patent Application No. 2016-057111 filed on Mar. 22, 2016 including description, claims, drawings, and abstract are incorporated herein by reference in its entirety.

BACKGROUND OF THE INVENTION

Field of the Invention

The present invention relates to an image reading device and an image forming system.

Description of the Related Art

Conventionally, an image reading device for color measurement of sheets of paper has been proposed, as is disclosed, for example, in JP 2007-153580 A, in which the heights of conveying rollers are changed according to the thickness of the sheet of paper to read the sheet of paper at an optimum depth of focus regardless of the thickness of the sheet of paper.

However, although in the prior art described in JP 2007-153580 A, variation in the height direction of a sheet of paper can be suppressed when the sheet of paper enters the conveying rollers, variation in the angular orientation of a sheet of paper cannot be suppressed when the sheet of paper enters the conveying rollers. Specifically, once the sheet of paper enters the conveying rollers, the sheet of paper shifts along the direction of rotation of the conveying rollers and the sheet of paper cannot be read at the optimum depth of focus.

Thus, in the prior art, the variation in the angular orientation of the sheet of paper cannot be suppressed, so that it is unable to keep the distance between a colorimeter and the sheet of paper constant and to improve color measurement accuracy.

SUMMARY OF THE INVENTION

The present invention has been made in order to solve the conventional problem, and an object thereof is to provide an image reading device and an image forming system which are capable of improving color measurement accuracy.

To achieve the abovementioned object, according to an aspect, an image reading device reflecting one aspect of the present invention comprises: a scanner configured to read an image formed on a sheet of paper; a first background member disposed opposite to the scanner and configured to reflect light emitted from the scanner; a colorimeter disposed downstream of the scanner and configured to take a color measurement of the image formed on the sheet of paper; a second background member disposed opposite to the colorimeter and configured to reflect light emitted from the colorimeter; a guide member disposed between the colorimeter and the second background member and configured to guide the sheet of paper passing between the colorimeter and the second background member; and a regulating member disposed opposite to the colorimeter and configured to regulate movement of the sheet of paper, wherein the regulating member includes: a first member disposed upstream of a color measurement position of the colorimeter and including a rolling member; a second member disposed downstream of the color measurement position of the colorimeter and including a rolling member; and a pressing member configured to press the first member and the second member against the guide member, and the pressing member is disposed in a position offset from axes of the first member and the second member.

According to the image reading device of an embodiment of the present invention, a regulating member regulates movement of a sheet of paper that varies between a colorimeter and a second background member. Additionally, a pressing member that is disposed in a position offset from an axis of each of a first member and a second member regulates variation in an angular orientation of the sheet of paper. Thus, the distance between the colorimeter and the sheet of paper can be kept constant and the distance between the sheet of paper and the second background member can be kept constant, thereby improving color measurement accuracy.

Furthermore, at least two of the first members are preferably provided and disposed in positions deviated from a region passing through the color measurement position of the colorimeter of a region along a conveying direction of the sheet of paper.

According to the image reading device of an embodiment of the present invention, the first member is disposed in a position deviated from a region passing through a color measurement position of the colorimeter. Thus, an image formed on the sheet of paper is not damaged by the first member before color measurement so that colored objects that form the image are not damaged and variation in results of color measurement caused by scratches on the image can be avoided.

Furthermore, the at least two of the first members are preferably disposed in opposition, and the at least one second member is preferably disposed in the region passing through the color measurement position of the colorimeter of the region along the conveying direction of the sheet of paper.

According to the image reading device of an embodiment of the present invention, at least two of the first members are disposed in opposition in positions deviated from the region passing through the color measurement position of the colorimeter and at least one second member is disposed in the region passing through the color measurement position of the colorimeter. Thus, the variation in the angular orientation of the sheet of paper is regulated by at least three points so that color measurement can be performed while reliably suppressing the variation in the angular orientation of the sheet of paper.

Furthermore, as the rolling member, each of the at least two first members and the at least one second member preferably comprises a roller that rolls as the sheet of paper is conveyed.

According to the image reading device of an embodiment of the present invention, the first members and the second member each include a roller that rolls as the sheet of paper is conveyed. Thus, the sheet of paper is smoothly conveyed when entering the first members or the second member so that the sheet of paper is smoothly conveyed while the movement of the sheet of paper is regulated.

Furthermore, as the rolling member, each of the at least two first members and the at least one second member preferably comprises a driving roller that conveys the sheet of paper.

According to the image reading device of an embodiment of the present invention, the first members and the second member each include a driving roller that conveys the sheet of paper. Thus, even though the movement of the sheet of paper variating between the colorimeter and the second background member is regulated, a conveying force operates to convey the sheet of paper upstream and downstream of the color measurement position of the colorimeter so that the sheet of paper is smoothly conveyed while the movement of the sheet of paper is regulated.

Furthermore, a load to press the at least two first members and the at least one second member against the guide member is preferably adjustable according to stiffness of the sheet of paper.

According to the image reading device of an embodiment of the present invention, a load to press the first members and the second member against a guide member is adjustable according to stiffness of the sheet of paper. Thus, a target load can be applied to the sheet of paper so that the sheet of paper can be conveyed without being jammed along the way while the movement of the sheet of paper is reliably regulated.

Furthermore, the guide member preferably includes: a first guide member disposed opposite to the colorimeter and configured to guide the sheet of paper along the conveying direction of the sheet of paper; and a second guide member disposed opposite to the first guide member and configured to guide the sheet of paper along the conveying direction of the sheet of paper, and the regulating member is preferably disposed opposite to the first guide member.

According to the image reading device of an embodiment of the present invention, the regulating member is disposed opposite to a first guide member. Thus, the first members and the second member can be pressed against the first guide member at the same time by the pressing member so that the variation in the angular orientation of the sheet of paper associated with the conveyance of the sheet of paper is suppressed due to a point of contact between the first members and the first guide member and a point of contact between the second member and the first guide member.

Furthermore, the guide member preferably includes: a first guide member disposed opposite to the colorimeter and configured to guide the sheet of paper along the conveying direction of the sheet of paper; and a second guide member disposed opposite to the first guide member and configured to guide the sheet of paper along the conveying direction of the sheet of paper, and the regulating member is preferably disposed opposite to the second guide member.

According to the image reading device of an embodiment of the present invention, the regulating member is disposed opposite to a second guide member. Thus, the first members and the second member can be pressed against the second guide member at the same time by the pressing member so that the variation in the angular orientation of the sheet of paper associated with the conveyance of the sheet of paper is suppressed due to a point of contact between the first members and the second guide member and a point of contact between the second member and the second guide member.

Furthermore, the scanner is preferably provided in a position for reading an image formed on a front face of the sheet of paper and in a position for reading an image formed on a back face of the sheet of paper, and a reading result of the scanner is preferably associated with a result of color measurement of the colorimeter.

According to the image reading device of an embodiment of the present invention, the sheet of paper is conveyed along a conveying path so that a front face and a back face of the sheet of paper are read by a scanner and then the image formed on the sheet of paper is measured by the colorimeter. Thus, color measurement of the sheet of paper is performed in a short time period. Additionally, a reading result read by the scanner is associated with a result of color measurement performed by the colorimeter so that a correlation between the reading result of the scanner and the color measurement result from the colorimeter is formed to enable interpolation of the color measurement result.

To achieve the abovementioned object, according to an aspect, an image forming system reflecting one aspect of the present invention comprises: the image reading device described above; and an image forming device configured to form an image on the sheet of paper.

According to the image forming system of an embodiment of the present invention, color measurement accuracy can be improved as with the image reading device.

According to the image forming system of an embodiment of the present invention, as a whole system, a feedback system with high accuracy can be constructed during maintenance.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

First Embodiment

Figure 1:
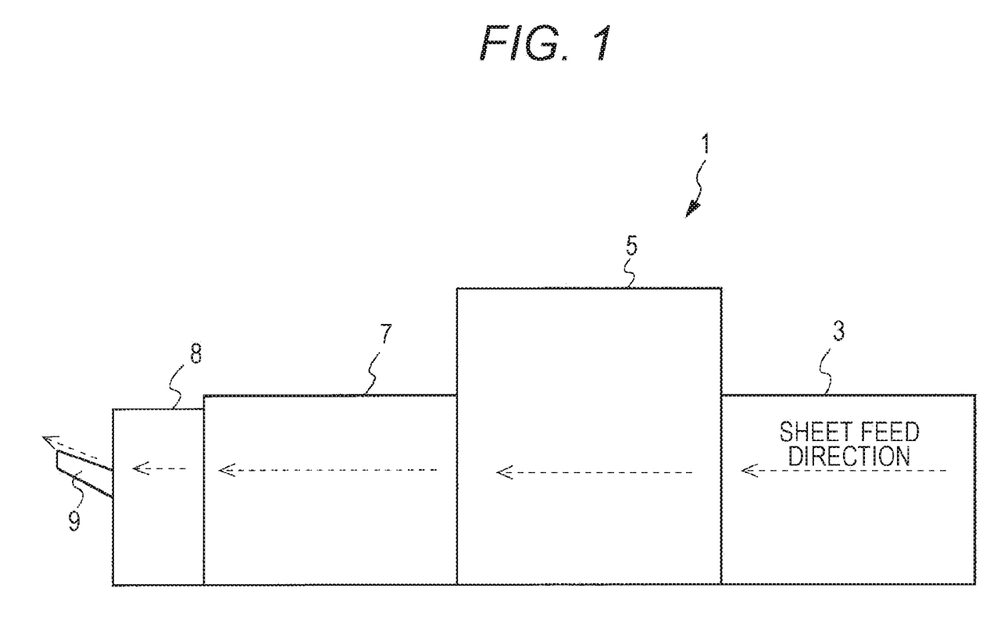
FIG. 1 is a diagram showing an example overall configuration of an image forming system according to a first embodiment of the present invention.

FIG. 1 is a diagram showing an example of overall configuration of an image forming system 1 according to a first embodiment of the present invention. As shown in FIG. 1, the image forming system 1 includes a paper feeder 3, an image forming device 5, an image reading device 7, and a paper ejector 8. The paper feeder 3 feeds a sheet of paper P to the image forming device 5. The image forming device 5 forms an image on the sheet of paper P fed from the paper feeder 3. The image reading device 7 reads the sheet of paper P on which the image is formed by the image forming device 5 and performs various processes. The paper ejector 8 includes an output tray 9 and outputs the sheet of paper P conveyed from the image reading device 7 to the output tray 9.

Figure 2:
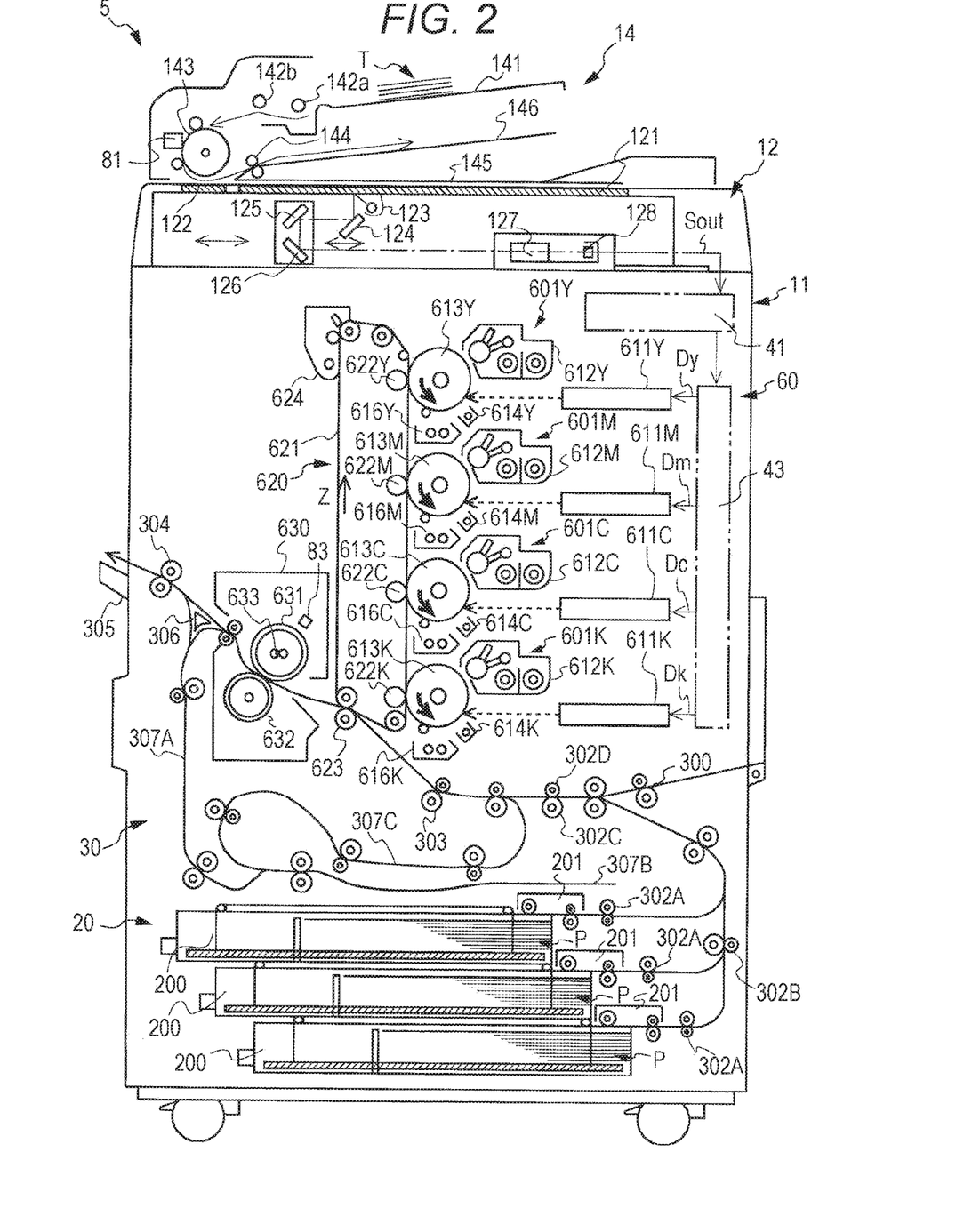
FIG. 2 is a diagram showing an example configuration of an image forming device according to the first embodiment of the present invention.

FIG. 2 is a diagram showing an example configuration of the image forming device 5 according to the first embodiment of the present invention. As shown in FIG. 2, the image forming device 5 is an example of a color copier and acquires image information by reading a color image formed on a document T. The image forming device 5 superimposes colors based on the acquired image information to form a color image. The image forming device 5 can be applied to other devices besides the color copier such as a color printer, a facsimile device, or a multi-functional machine thereof.

The image forming device 5 includes an image forming device body 11. On the image forming device body 11, a color image reading unit 12 and an automatic document feeder 14 are disposed. The image forming device body 11 includes, as will be described in detail below, a control unit 41, an image processing unit 43, an image forming unit 60, a paper feeding unit 20, and a conveying unit 30.

The automatic document feeder 14 is disposed on the image reading unit 12. The automatic document feeder 14 automatically feeds one or a plurality of documents T during an automatic paper feeding mode. The automatic paper feeding mode causes the document T placed on the automatic document feeder 14 to be fed, and causes an image printed on the document T to be read by the image reading unit 12.

The automatic document feeder 14 includes a document placing unit 141, a roller 142a, a roller 142b, a roller 143, a roller 144, an inverting unit 145, and an ejection tray 146. On the document placing unit 141, the one or the plurality of the documents T is placed. The roller 142a and the roller 142b are provided downstream of the document placing unit 141. The roller 143 is provided downstream of the roller 142a and the roller 142b. On the outer peripheral side of the roller 143, a positioning sensing unit 81 is provided.

When the automatic paper feeding mode is selected, the document T that is delivered from the document placing unit 141 is conveyed by the roller 143 in a U-shaped turn. When the document T is placed on the document placing unit 141 and the automatic paper feeding mode is selected, a recording surface of the document T preferably faces upward.

After being read by the image reading unit 12, the document T is conveyed by the roller 144 and ejected to the ejection tray 146. The automatic document feeder 14 can cause the image reading unit 12 to read not only the recording surface of the document T but also the back of the recording surface of the document T by conveying the document T to the inverting unit 145.

The positioning sensing unit 81 senses the document T on which an image is printed. The positioning sensing unit 81 is configured, for example, with a reflective photosensor. In the positioning sensing unit 81, an output signal rises when the document T is sensed and the output signal falls when the document T is not sensed, the result of which is sent to the control unit 41. That is, the output signal is maintained at a constant value during the time in which the document T passes through the positioning sensing unit 81.

The image reading unit 12 operates to read the color image formed on the document T, that is, the color image printed on the document T. The image reading unit 12 includes a one-dimensional image sensor 128. In addition to the image sensor 128, the image reading unit 12 also includes a first platen glass 121, a second platen glass 122, a light source 123, mirrors 124, 125, 126, an imaging optical unit 127, and an optical drive unit (not shown).

The light source 123 emits light onto the document T. The optical drive unit (not shown) relatively moves the document T or the image sensor 128 in a sub-scanning direction. The sub-scanning direction is a direction orthogonal to a main scanning direction where the main scanning direction is an orientation of a plurality of light receiving elements that constitute the image sensor 128.

Thus, the document T is conveyed by the automatic document feeder 14 and the image on one side or both sides of the document T can be subjected to scanning exposure by an optical system of the image reading unit 12. Incident light that reflects an image reading operation is read by the image sensor 128. The image sensor 128, during a platen mode, outputs an image reading signal Sout of an RGB color system acquired by reading the document T. The platen mode causes the image printed on the document T that is placed on a platen glass such as the first platen glass 121 and the second platen glass 122 to be read automatically by the optical drive unit (not shown) being driven.

For the image sensor 128, a three-line color CCD imager is used. The image sensor 128 includes a plurality of arrays of the light receiving elements that are arranged in the main scanning direction. Specifically, reading sensors for optical sensing of each of colors red (R), green (G), and blue (B) divide pixels at different positions in the sub-scanning direction orthogonal to the main scanning direction and simultaneously read optical information of each of the colors R, G, and B. For example, in the automatic paper feeding mode, when the document T is inverted along the U shape by the roller 143, the image sensor 128 reads a front face of the document T and outputs the image reading signal Sout.

More specifically, the image sensor 128 is connected to the image processing unit 43 via the control unit 41 and photoelectrically converts the incident light. In the image processing unit 43, the analog image reading signal Sout that has been photoelectrically converted by the image sensor 128 is subjected to processes such as analog processing, A/D conversion, shading correction, image compression, and multiplication. This results in the image reading signal Sout turning into digital image data that includes an R color component, a G color component, and a B color component. The image processing unit 43 converts, using a three-dimensional color information conversion table, the digital image data, that is, the RGB codes to image data of colors yellow (Y), magenta (M), cyan (C), and black (K), that is, Dy, Dm, Dc, and Dk. The image processing unit 43 transfers the converted image data to LED writing units 611Y, 611M, 611C, 611K, which are included in the image forming unit 60.

The image forming unit 60 uses an electrophotographic process technology. The image forming unit 60 forms an intermediate transfer method color image. The image forming unit 60 employs, for example, a vertical tandem system.

Specifically, the image forming unit 60 forms a color image based on the image data transferred from the image processing unit 43, that is, Dy, Dm, Dc, and Dk. The image forming unit 60 includes respective image forming units 601Y, 601M, 601C, 601K for each color, an intermediate transfer unit 620, and a fixing unit 630 that fixes a toner image.

The image forming unit 601Y forms a yellow (Y) image. The image forming unit 601Y includes a photoconductive drum 613Y, a charging unit 614Y, the LED writing unit 611Y, a developing unit 612Y, and a cleaning unit 616Y.

The photoconductive drum 613Y forms a Y toner image. The charging unit 614Y is disposed around the photoconductive drum 613Y and uniformly negatively charges the surface of the photoconductive drum 613Y by corona discharge. The LED writing unit 611Y emits light that corresponds to a Y color component image to the photoconductive drum 613Y. The developing unit 612Y deposits a Y color component toner on the surface of the photoconductive drum 613Y and visualizes an electrostatic latent image to form a toner image. The cleaning unit 616Y removes residual toner remaining on the surface of the photoconductive drum 613Y after primary transfer.

Each of the image forming units 601M, 601C, 601K has the same configuration and function as the image forming unit 601Y except that the colors of the images that they form are different, and thus the description thereof will not be repeated.

The image forming units 601Y, 601M, 601C, 601K will be collectively referred to as the image forming units 601. The LED writing units 611Y, 611M, 611C, 611K will be collectively referred to as the LED writing units 611. The developing units 612Y, 612M, 612C, 612K will be collectively referred to as the developing units 612. The photoconductive drums 613Y, 613M, 613C, 613K will be collectively referred to as the photoconductive drums 613. The charging units 614Y, 614M, 614C, 614K will be collectively referred to as the charging units 614. The cleaning units 616Y, 616M, 616C, 616K will be collectively referred to as the cleaning units 616.

The intermediate transfer unit 620 includes, for example, an intermediate transfer belt 621, primary transfer rollers 622Y, 622M, 622C, 622K, a secondary transfer roller 623, and a belt cleaning device 624.

The intermediate transfer belt 621 is an endless belt looped around a plurality of support rollers. At least one of the plurality of support rollers is a driving roller and the others are driven rollers. For example, the support roller that is disposed downstream of the K color component primary transfer roller 622K in a direction of belt travel is preferably the driving roller. The intermediate transfer belt 621 travels in the direction of arrow Z at a constant speed due to rotation of the driving roller.

The primary transfer rollers 622Y, 622M, 622C, 622K are disposed on an inner surface side of the intermediate transfer belt 621 opposite to the respective photoconductive drums 613 of each of the color components. The primary transfer rollers 622Y, 622M, 622C, 622K are pressed against the photoconductive drums 613Y, 613M, 613C, 613K with the intermediate transfer belt 621 therebetween. Thus, primary transfer nips for transferring the toner images from the photoconductive drums 613Y, 613M, 613C, 613K to the intermediate transfer belt 621 are formed.

The primary transfer rollers 622Y, 622M, 622C, 622K will be collectively referred to as the primary transfer rollers 622.

The secondary transfer roller 623 is disposed on an outer surface side of the intermediate transfer belt 621 opposite to one of the plurality of support rollers. The support roller that is disposed opposite to the secondary transfer roller 623 is referred to as a backup roller. The secondary transfer roller 623 is pressed against the backup roller with the intermediate transfer belt 621 therebetween, and thus, a secondary transfer nip for transferring the toner image from the intermediate transfer belt 621 to the sheet of paper P is formed.

When the intermediate transfer belt 621 passes through the primary transfer nips, the toner images on the photoconductive drums 613 are primarily transferred to the intermediate transfer belt 621 by being overlaid successively on top of one another. Specifically, a primary transfer bias is applied to the primary transfer rollers 622 and an electric charge opposite to that of the toner is applied to a back face of the intermediate transfer belt 621, that is, the side that comes into contact with the primary transfer rollers 622, so that the toner images are electrostatically transferred to the intermediate transfer belt 621.

When the sheet of paper P passes through the secondary transfer nip, the toner image on the intermediate transfer belt 621 is secondarily transferred to the sheet of paper P. Specifically, a secondary transfer bias is applied to the secondary transfer roller 623 and an electric charge opposite to that of the toner is applied to a back face of the sheet of paper P, that is, the side that comes into contact with the secondary transfer roller 623, so that the toner image is electrostatically transferred to the sheet of paper P. The sheet of paper P to which the toner image is transferred is conveyed to the fixing unit 630.

The belt cleaning device 624 includes, for example, a belt cleaning blade in sliding contact with a front face of the intermediate transfer belt 621. The belt cleaning device 624 removes residual toner remaining on the front face of the intermediate transfer belt 621 after the secondary transfer.

The fixing unit 630 includes a heated roller 631, a pressure roller 632, a heating unit 633, and a temperature sensing unit 83, and fixes the toner image transferred at the image forming unit 60 on the sheet of paper P.

Specifically, the heating unit 633 is provided inside the heated roller 631 and intermittently heats the heated roller 631. The pressure roller 632 is disposed opposite to the heated roller 631 and pressurizes the heated roller 631. The temperature sensing unit 83 is provided around the heated roller 631 and senses the temperature of the heated roller 631. A sampling period of the temperature sensing unit 83 is, for example, 100 ms.

In the fixing unit 630, the heating unit 633 heats the heated roller 631 in response to the sensing result by the temperature sensing unit 83 that senses the temperature of the heated roller 631. The fixing unit 630 causes the heated roller 631 and the pressure roller 632 to press against each other so that a fixing nip is formed between the heated roller 631 and the pressure roller 632.

The fixing unit 630 fixes the transferred toner image on the sheet of paper P through the actions of pressure by the pressure roller 632 and heat of the heated roller 631. On the sheet of paper P on which the toner image has been fixed by the fixing unit 630, an image is printed. The sheet of paper P on which the image is printed is output outside the device by an ejection roller 304 and is conveyed, for example, to the image reading device 7. The sheet of paper P on which the image is printed may be loaded on an output tray 305 without being conveyed to the image reading device 7.

The paper feeding unit 20 includes, for example, a paper feeding cassette 200 and a supply roller 201. The paper feeding cassette 200 contains the sheet of paper P. The supply roller 201 takes in the sheet of paper P contained inside the paper feeding cassette 200 and delivers the sheet of paper P to the conveying unit 30.

The conveying unit 30 is configured with a conveying path 300 and conveys the sheet of paper P along the conveying path 300. The conveying path 300 includes, for example, a paper feeding roller 302A, conveying rollers 302B, 302C, 302D, and a resist roller 303.

The conveying path 300 conveys the sheet of paper P fed from the paper feeding unit 20 to the image forming unit 60. When an image is also to be formed on the back face of the sheet of paper P, the sheet of paper P is conveyed, after the image is formed on a front face of the sheet of paper P, by a junction unit 306, in order, along a circulation sheet feeding path 307A, an inverting conveying path 307B, and a refeeding conveying path 307C.

Various processes are performed in the image forming device 5 via the control unit 41. For example, the image reading signal Sout output from the image reading unit 12 is transmitted to an image memory (not shown) or the image processing unit 43 via the control unit 41. The image memory includes, for example, a hard disk drive.

Specifically, the control unit 41 includes mainly a central processing unit (CPU), a read only memory (ROM), a random access memory (RAM), and an input/output interface (I/O interface), which are not shown. The control unit 41 controls operations of the units of the image forming device 5 by the CPU retrieving various programs corresponding to the content of the processes from a storage unit (not shown), deploying them on the RAM, and working together with the deployed various programs.

That is, the control unit 41 controls the operations of the image forming device 5 and can be implemented by a microcomputer that mainly includes a CPU, a ROM, a RAM, and an I/O interface, which are not shown. Various functions are achieved by the control unit 41 executing a predetermined control program.

Figure 3:
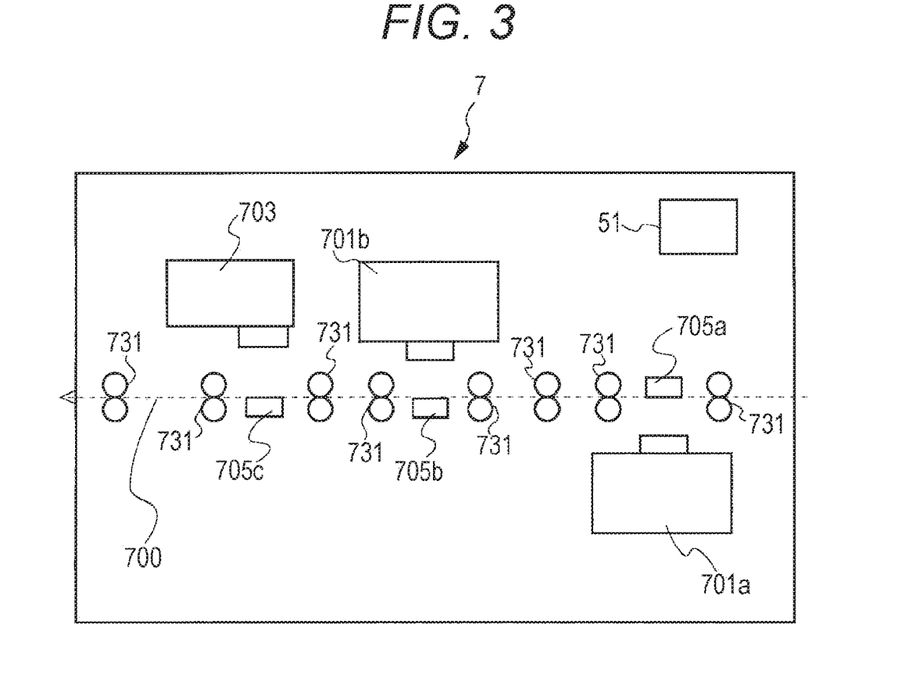
FIG. 3 is a diagram showing an example configuration of an image reading device according to the first embodiment of the present invention.

FIG. 3 is a diagram showing an example configuration of the image reading device 7 according to the first embodiment of the present invention. The image reading device 7 is disposed downstream of the image forming device 5 and reads the image printed on one side or both sides of the sheet of paper P. The image reading device 7 calculates the amount of correction of the image based on readings such as of the color, position, and magnification of the image printed on the sheet of paper P and feeds back the calculated amount of correction of the image to the image forming device 5.

The image reading device 7 includes, for example, a control unit 51, scanners 701a, 701b, a colorimeter 703, first background members 705a, 705b, a second background member 705c, a conveying roller 731, and a conveying path 700. The conveying path 700 is a path for feeding the sheet of paper P supplied from the image forming device 5, and the sheet of paper P is conveyed by the conveying roller 731 being driven.

The image reading device 7 receives the sheet of paper P supplied from the image forming device 5 and causes the scanners 701a, 701b or the colorimeter 703 to detect the image formed on the sheet of paper P. The detection of the image is output to the control unit 51 of the image reading device 7.

The control unit 51 controls operations of the image reading device 7 and can be implemented by a microcomputer that mainly includes a CPU, a ROM, a RAM, and an I/O interface, which are not shown. Various functions are achieved by the control unit 51 executing a predetermined control program. The control unit 51 performs various processes based on the detection of the image and transmits the result of the performance to the control unit 41 of the image forming device 5.

The scanners 701a, 701b are each disposed opposite to the sheet of paper P that is fed along the conveying path 700. The first background member 705a is disposed opposite to the scanner 701a and reflects light emitted from the scanner 701a. Light including the light reflected from the first background member 705a enters the scanner 701a, which reads the image formed on the sheet of paper P. The first background member 705b is disposed opposite to the scanner 701b and reflects light emitted from the scanner 701b. Light including the light reflected from the first background member 705b enters the scanner 701b, which reads the image formed on the sheet of paper P.

Specifically, the scanner 701a reads the back face of the sheet of paper P. The reading result of the back face of the sheet of paper P is used, for example, to check misalignment between the front and the back of the image formed on the sheet of paper P or to check whether there are any unintended images. The scanner 701b reads the front face of the sheet of paper P. The scanner 701b reads the image formed on the sheet of paper P, for example, a patch 801 shown in FIG. 6 described below.

When no distinction is made between the scanners 701a, 701b, they are referred to as the scanners 701.

The operations of the image reading device 7 are performed by an in-line system or an off-line system. The in-line system is configured such that the sheet of paper P which is supplied from the image forming device 5 and on which the image is formed is fed directly to the image reading device 7. The off-line system is not configured such that the sheet of paper P which is supplied from the image forming device 5 and on which the image is formed is fed directly to the image reading device 7 but is configured such that the image forming device 5 and the image reading device 7 are independent of each other. While this embodiment is described below in the context of the in-line system, the off-line system may also be employed.

The colorimeter 703 is disposed downstream of the scanners 701. The colorimeter 703 is disposed opposite to the sheet of paper P that is fed along the conveying path 700. The second background member 705c is disposed opposite to the colorimeter 703 and reflects light emitted from the colorimeter 703. Light including the light reflected from the second background member 705c enters the colorimeter 703, which takes color measurements of the image formed on the sheet of paper P. For example, the colorimeter 703 takes color measurements of the patch 801, thereby guaranteeing absolute values of colors in the image to be formed on the sheet of paper P.

Specifically, the colorimeter 703 emits visible light toward the patch 801 from a visible light source (not shown). The colorimeter 703 acquires an optical spectrum of reflections of the visible light from the second background member 705c. The colorimeter 703 performs operations to a predetermined color system based on the acquired optical spectrum to derive the colors of the patch 801.

The results of color measurement of the patch 801 are generated as color values ΔE, which are numeric data represented by a predetermined color system, such as Lab color space data or XYZ color space data, in other words, color measurement values, which are output to the control unit 51 or the control unit 41.

A color measurement range, that is, a viewing angle of the colorimeter 703 is set narrower than a read range of the scanners 701 and narrower than a width of the patch 801 along a paper width direction. Specifically, a lens unit that obtains reflected light of the patch 801 is, for example, about 4 mm.

The colorimeter 703 thus performs color measurements by limiting to a fixed viewing angle range so as to be able to reproduce color information with a higher accuracy than the scanners 701.

The control unit 51 corrects the color information of the patch 801 read by the scanners 701 based on the color measurement values of the patch 801 measured by the colorimeter 703. Specifically, the control unit 51 associates the color information of the patch 801 measured by the colorimeter 703 and the color information of the patch 801 read by the scanners 701. With the color information of the patch 801 from the colorimeter 703 associated with the color information of the patch 801 from the scanners 701, the results of color measurement from the colorimeter 703 can be reflected on the reading results of the scanners 701 so that an accurate amount of correction can be obtained.

In other words, the sheet of paper P is conveyed along the conveying path 700 so that the front face and the back face of the sheet of paper P are read by the scanners 701 and then the image formed on the sheet of paper P is measured by the colorimeter 703. Thus, the color measurement of the sheet of paper P is performed in a short time period. Additionally, with the reading results of the scanners 701 associated with the results of color measurement from the colorimeter 703, a correlation between the reading results of the scanners 701 and the color measurement results from the colorimeter 703 can be formed, thereby enabling interpolation of the color measurement results.

The image processing unit 43 optimizes the image to be formed by the image forming unit 60 based on the amount of correction calculated by the control unit 51. The optimization process of the image performed by the image processing unit 43 includes, for example, front-to-back position adjustment, density adjustment, and color adjustment of the image printed on the sheet of paper P. Thus, the image processing unit 43 can correct the color, position, or magnification of the image formed on the sheet of paper P according to reading results of the sheet of paper P by the image reading device 7. Consequently, the image forming system 1 as a whole can construct a feedback system with high accuracy during maintenance.

Figure 4:
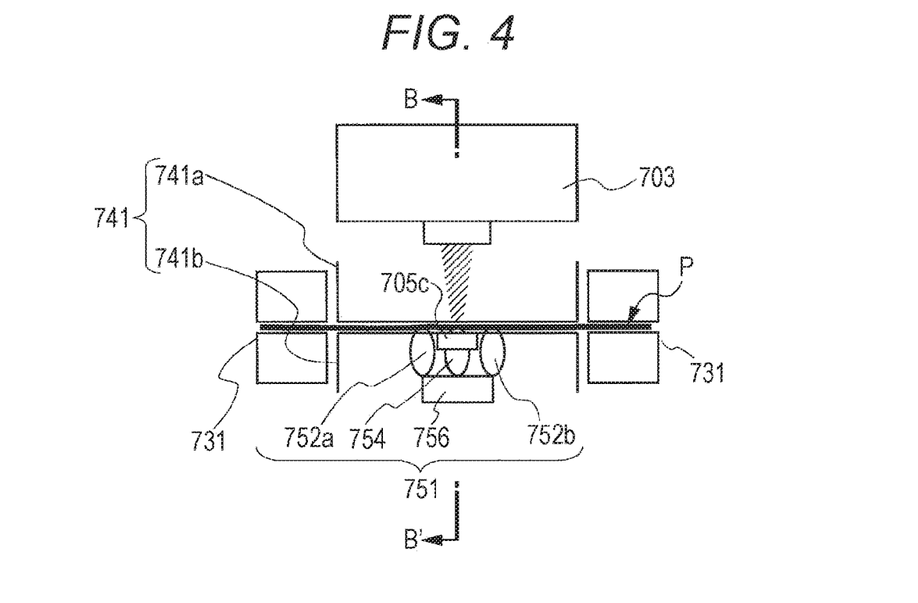
FIG. 4 is a front view of a guide member and a regulating member according to the first embodiment of the present invention.
Figure 5:
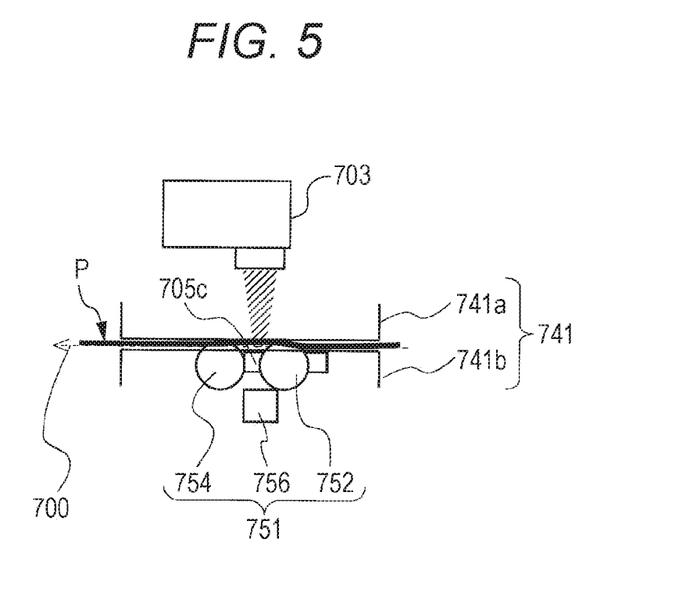
FIG. 5 is a cross-sectional view along the direction B-B' of the guide member and the regulating member according to the first embodiment of the present invention.
Figure 6:
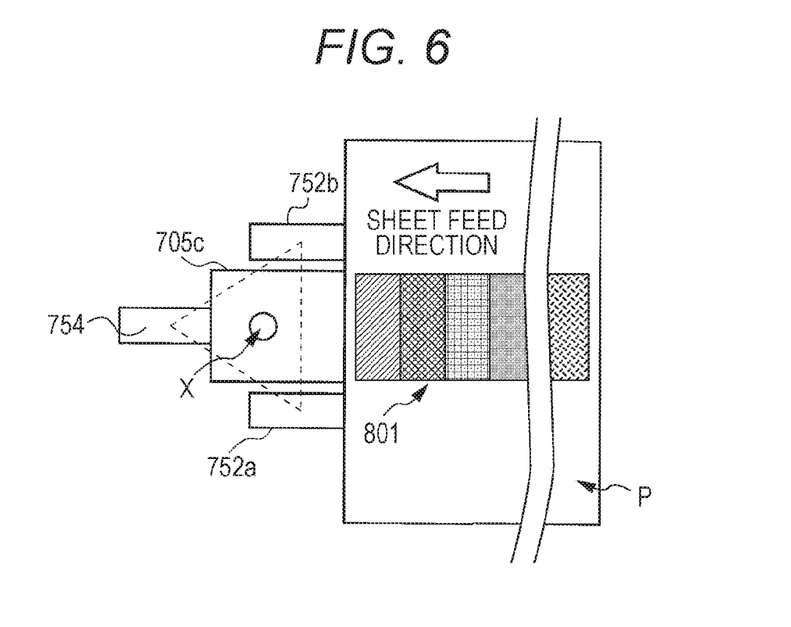
FIG. 6 is a plan view of the guide member and the regulating member according to the first embodiment of the present invention.
Figure 7:
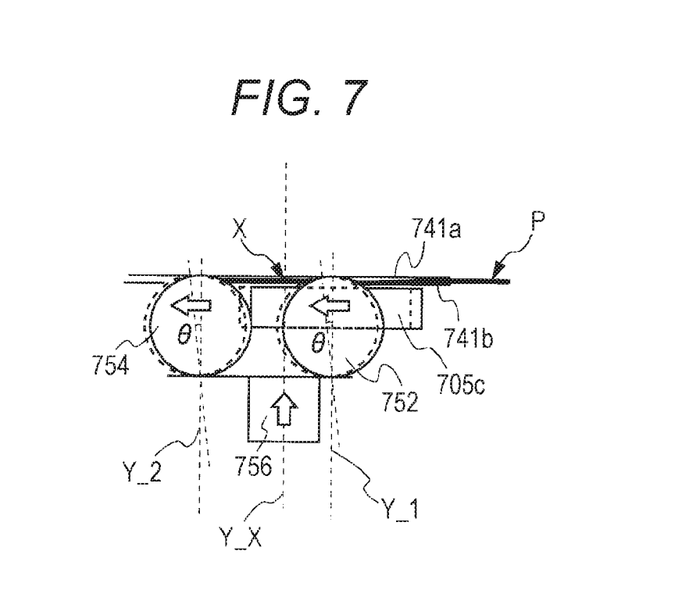
FIG. 7 is a diagram showing an example arrangement of a pressing member according to the first embodiment of the present invention.
Figure 8:
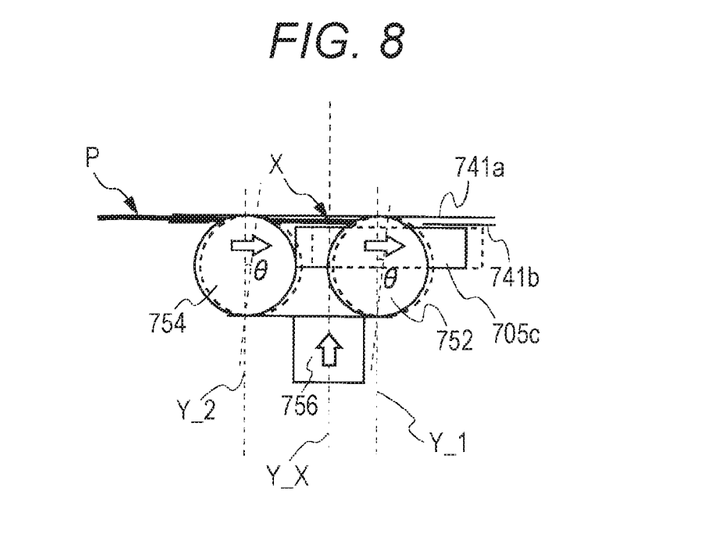
FIG. 8 is a diagram showing another example arrangement of the pressing member according to the first embodiment of the present invention.

FIG. 4 is a front view of a guide member 741 and a regulating member 751 according to the first embodiment of the present invention. FIG. 5 is a cross-sectional view along the direction B-B' of the guide member 741 and the regulating member 751 according to the first embodiment of the present invention. FIG. 6 is a plan view of the guide member 741 and the regulating member 751 according to the first embodiment of the present invention. FIG. 7 is a diagram showing an example arrangement of a pressing member 756 according to the first embodiment of the present invention. FIG. 8 is a diagram showing another example arrangement of the pressing member 756 according to the first embodiment of the present invention.

As shown in FIGS. 4 and 5, the guide member 741 is disposed between the colorimeter 703 and the second background member 705c. The guide member 741 guides the sheet of paper P that passes through the colorimeter 703 and the second background member 705c. The guide member 741 includes a first guide member 741a and a second guide member 741b. The first guide member 741a is disposed opposite to the colorimeter 703 and guides the sheet of paper P along a conveying direction of the sheet of paper P. The second guide member 741b is disposed opposite to the first guide member 741a and guides the sheet of paper P along the conveying direction of the sheet of paper P.

The regulating member 751 is disposed opposite to the colorimeter 703 and regulates movement of the sheet of paper P. The regulating member 751 is provided integrally with the second background member 705c. Thus, the regulating member 751 can maintain a constant distance between the sheet of paper P and the second background member 705c and can prevent deterioration of durability of the second background member 705c due to the sheet of paper P rubbing against the second background member 705c.

The movement of the sheet of paper P is regulated by the regulating member 751 pressing against the sheet of paper P. Specifically, as shown in FIGS. 4 and 5, the regulating member 751 is disposed opposite to the first guide member 741a. The regulating member 751 includes first members 752a, 752b, a second member 754, and the pressing member 756.

As shown in FIG. 6, the first members 752a, 752b are disposed upstream of a color measurement position X of the colorimeter 703 and include rolling members. When no distinction is made between the first members 752a, 752b, they are referred to as the first members 752.

At least two of the first members 752 are provided. The first members 752 are disposed in positions deviated from a region passing through the color measurement position X of the colorimeter 703 of a region along the conveying direction of the sheet of paper P. At least two of the first members 752 are disposed in opposition. For example, the first member 752a and the first member 752b are disposed in opposition.

As shown in FIG. 6, the second member 754 is disposed downstream of the color measurement position X of the colorimeter 703 and includes a rolling member. At least one of the second member 754 is provided. The second member 754 is disposed in the region passing through the color measurement position X of the colorimeter 703 of the region along the conveying direction of the sheet of paper P.

As the rolling member, each of the first members 752 and the second member 754 includes a roller that rolls as the sheet of paper P is conveyed. As the rolling member, each of the first members 752 and the second member 754 may include a driving roller that conveys the sheet of paper P.

As shown in FIGS. 7 and 8, the pressing member 756 presses the first members 752 and the second member 754 against the guide member 741. The pressing member 756 is disposed in a position offset from axes of the first members 752 and the second member 754. For the pressing member 756, a load to press the first members 752 and the second member 754 against the guide member 741 is adjustable according to stiffness of the sheet of paper P. Specifically, the pressing member 756 is composed of an elastic member and can bias the guide member 741. The pressing member 756 includes a spring member such as a coil spring or a leaf spring.

Figure 12:
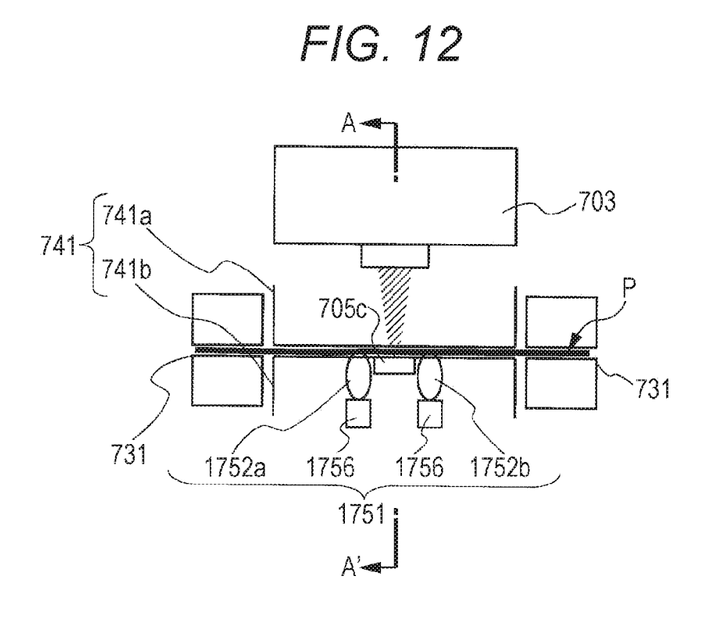
FIG. 12 is a front view of the guide member and a regulating member according to a prior art example.
Figure 13:
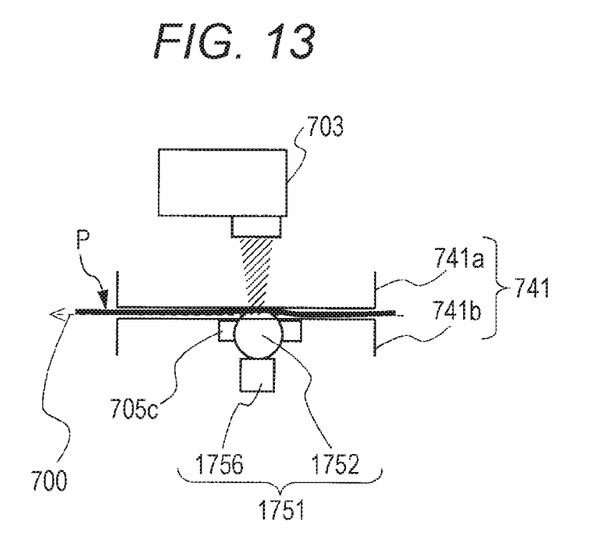
FIG. 13 is a cross-sectional view along the direction A-A' of the guide member and the regulating member according to the prior art example.
Figure 14:
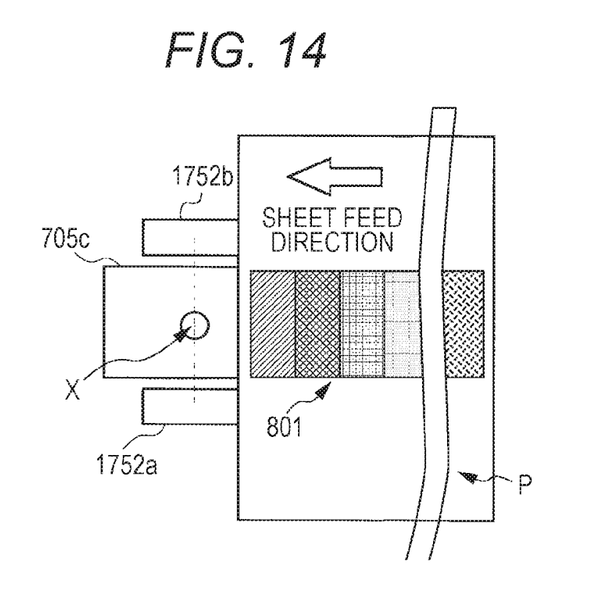
FIG. 14 is a plan view of the guide member and the regulating member according to the prior art example.
Figure 15:
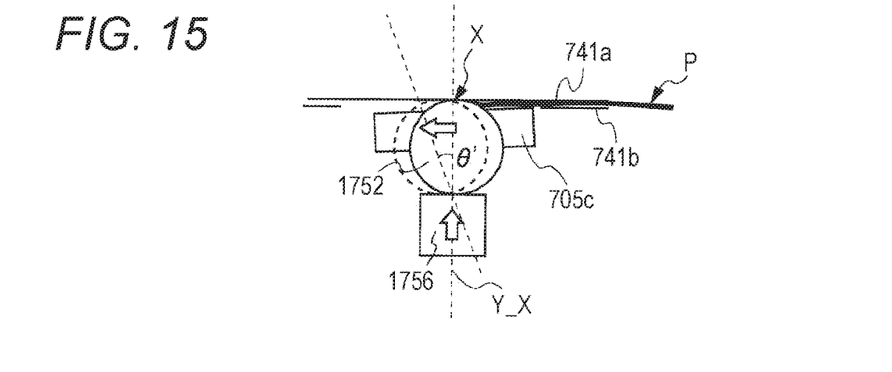
FIG. 15 is a diagram showing an example arrangement of the pressing member according to the prior art example.
Figure 16:
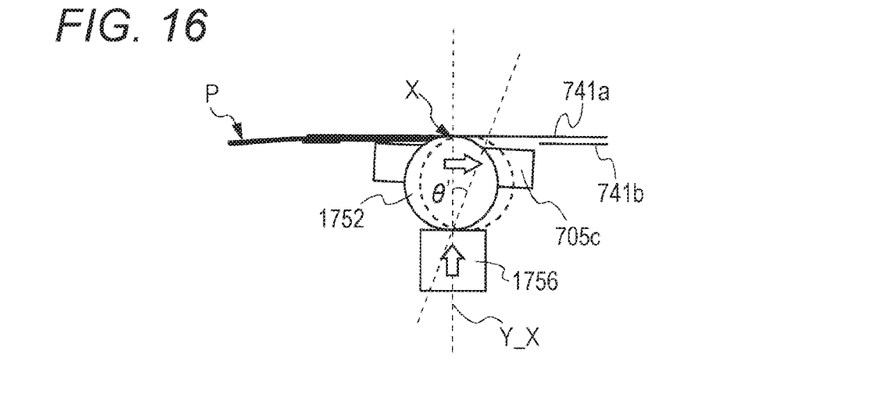
FIG. 16 is a diagram showing another example arrangement of the pressing member according to the prior art example.
Figure 17:
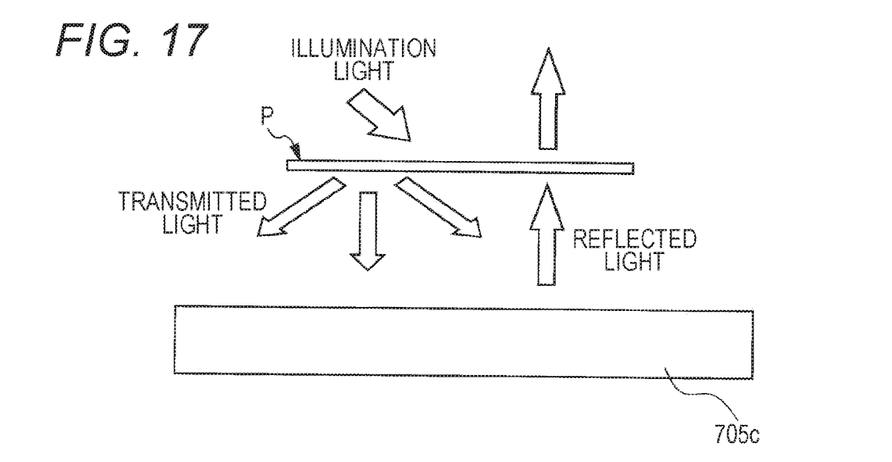
FIG. 17 is a diagram showing an example of light applied to the sheet of paper P according to the prior art example.

The operation and effects of this embodiment are described in comparison with a prior art example. FIG. 12 is a front view of the guide member 741 and a regulating member 1751 according a prior art example. FIG. 13 is a cross-sectional view along the direction A-A' of the guide member 741 and the regulating member 1751 according to the prior art example. FIG. 14 is a plan view of the guide member 741 and the regulating member 1751 according to the prior art example. FIG. 15 is a diagram showing an example arrangement of a pressing member 1756 according to the prior art example. FIG. 16 is a diagram showing another example arrangement of the pressing member 1756 according to the prior art example. FIG. 17 is a diagram showing an example of light applied to the sheet of paper P according to the prior art example.

In FIGS. 12 to 17, a first member 1752a and a first member 1752b are disposed on opposite sides of the color measurement position X of the colorimeter 703. As shown in FIGS. 12 and 13, the first member 1752a is pressed against the first guide member 741a by the pressing member 1756. The first member 1752b is pressed against the first guide member 741a by the pressing member 1756.

That is, the regulating member 1751 includes the first members 1752a, 1752b, and the pressing member 1756, and movement of the sheet of paper P in a height direction of the sheet of paper P is regulated by the first members 1752a, 1752b. When no distinction is made between the first members 1752a, 1752b, they are referred to as the first members 1752.

Specifically, the regulating member 1751 is provided integrally with the second background member 705c, and a fixed gap is formed between the second background member 705c and the sheet of paper P that passes over the second background member 705c. Thus, deterioration of durability of the second background member 705c caused by the sheet of paper P rubbing against the second background member 705c is improved.

As shown in FIG. 14, the regulating member 1751 regulates the movement of the sheet of paper P by two points of the first member 1752a and the first member 1752b. Thus, as shown in FIGS. 15 and 16, when the sheet of paper P is conveyed and enters the second background member 705c or when the sheet of paper P is conveyed and leaves the second background member 705c, an angle of rotation θ' is generated near the color measurement position X in the regulating member 1751 and the second background member 705c.

For example, as shown in FIG. 15, when the sheet of paper P is conveyed and enters the second background member 705c, the angle of rotation θ' in a left direction is generated in the first members 1752 and the second background member 705c. As shown in FIG. 16, when the sheet of paper P is conveyed and leaves the second background member 705c, the angle of rotation θ' in a right direction is generated in the first members 1752 and the second background member 705c.

Consequently, a correct amount of reflected light with respect to incident light from the colorimeter 703 cannot be returned from the second background member 705c to the colorimeter 703. As a result, the colorimeter 703 is unable to read colors accurately.

Specifically, as shown in FIG. 17, the amount of light that enters the colorimeter 703 changes due to, for example, color and material of the second background member 705c, distance between the second background member 705c and the colorimeter 703, and area of the second background member 705c. Thus, to take accurate color measurements of the image formed on the sheet of paper P with the colorimeter 703, it is necessary to, at least, keep the distance constant between the colorimeter 703 and the sheet of paper P and between the sheet of paper P and the second background member 705c. For example, a difference of 0.5 mm in the distance between the colorimeter 703 and the color measurement position X changes the color value ΔE, which is the color measurement result from the colorimeter 703, by about 1.0.

Although in the guide member 741, a gap between the first guide member 741a and the second guide member 741b is conventionally set to about 2 to 3 mm, as shown in FIGS. 12 and 13, the color value ΔE changes significantly due to, for example, flutter of the sheet of paper P in the gap. Additionally, even though a gap is kept to about 1 mm also at a read point in the automatic document feeder 14, the spectral colorimeter 703 generally does not allow height variation of the sheet of paper P of even 1 mm. Furthermore, even when thick paper, which transmits less light compared to thin paper, is used, the angle of rotation θ' generated in the second background member 705c causes reduction in color measurement accuracy when the distance between the colorimeter 703 and the color measurement position X changes 1 mm or more due to a change in an angle of reflection of the transmitted light.

In this embodiment, the movement of the sheet of paper P varying between the colorimeter 703 and the second background member 705c is regulated by the regulating member 751. The movement of the sheet of paper P varying in a direction of rotation of the second background member 705c is also regulated due to the pressing member 756 being disposed in a position offset from axis lines Y_1, Y_2 that respectively pass through axial centers of the first members 752 and the second member 754.

Specifically, as shown in FIGS. 6 to 8, the axis line Y_1 of the first members 752 is a line that passes a point of contact between the first members 752 and the first guide member 741a of the axial center of the first members 752. The axis line Y_2 of the second member 754 is a line that passes a point of contact between the second member 754 and the first guide member 741a of the axial center of the second member 754.

Thus, the axis line Y_1 of the first members 752, the axis line Y_2 of the second member 754, and a line Y_X that passes through the center of gravity of the pressing member 756 are in positions offset from one another. Consequently, the first members 752 and the second member 754 press the sheet of paper P at three points in a direction opposite to the direction of the light emitted from the colorimeter 703 to the color measurement position X. This configuration enables color measurements of the patch 801 to be performed while wobbling of the sheet of paper P when being conveyed is suppressed and variation in an angular orientation of the sheet of paper P is suppressed.

That is, the point of contact between the first members 752 and the first guide member 741a and the point of contact between the second member 754 and the first guide member 741a regulate rotation of the sheet of paper P that is associated with the conveyance of the sheet of paper P. Thus, an angle of rotation θ is smaller than the conventional angle of rotation θ'.

Consequently, the distance between the colorimeter 703 and the sheet of paper P can be kept constant and the distance between the sheet of paper P and the second background member 705c can be kept constant so that color measurement accuracy is improved.

Additionally, the first members 752 are disposed in positions deviated from the region passing through the color measurement position X of the colorimeter 703 so that the image formed on the sheet of paper P is not damaged by the first members 752 before the color measurement. Thus, colored objects that form the image are not damaged and variation in the results of color measurement caused by scratches on the image can be avoided. For example, as shown in FIG. 6, the first members 752a, 752b are not disposed on a direction of travel of the patch 801. The patch 801 thus cannot be damaged by the first members 752a, 752b before the patch 801 reaches the color measurement position X. Consequently, the colored objects that form the patch 801 are not damaged and variation in the results of color measurement caused by scratches on the patch 801 can be avoided.

At least two of the first members 752 are disposed in opposition in positions deviated from the region passing through the color measurement position X of the colorimeter 703 and at least one second member 754 is disposed in the region passing through the color measurement position X of the colorimeter 703. Thus, as shown in FIG. 6, a three point plane that contacts the second guide member 741b is formed around the color measurement position X such that the variation in the angular orientation of the sheet of paper P is regulated by at least three points. Consequently, color measurement can be performed while the variation in the angular orientation of the sheet of paper P is reliably suppressed.

Here, assume that each of the first members 752 and the second member 754 includes a roller that rolls as the sheet of paper P is conveyed. In this case, as shown in FIG. 7, the sheet of paper P is smoothly conveyed when the sheet of paper P enters the first members 752 or the second member 754 so that the sheet of paper P is smoothly conveyed while the movement of the sheet of paper P is regulated.

Furthermore, assume that each of the first members 752 and the second member 754 is a driving roller that conveys the sheet of paper P. In this case, as shown in FIG. 8, even though the movement of the sheet of paper P variating between the colorimeter 703 and the second background member 705c is regulated, a conveying force operates to convey the sheet of paper P upstream and downstream of the color measurement position X of the colorimeter 703 so that the sheet of paper P is smoothly conveyed while the movement of the sheet of paper P is regulated.

The load to press the first members 752 and the second member 754 against the guide member 741 is adjustable according to the stiffness of the sheet of paper P so that a target load can be applied to the sheet of paper P. Thus, in FIGS. 7 and 8, in a case where the sheet of paper P is thick paper, a load corresponding to the thick paper is applied to both the first members 752 and the second member 754 from the pressing member 756. This is the same for the case where the sheet of paper P is thin paper. Consequently, the sheet of paper P can be conveyed without being jammed along the way while the movement of the sheet of paper P is reliably regulated.

Additionally, the regulating member 751 is disposed opposite to the first guide member 741a. Thus, the first members 752 and the second member 754 can be pressed against the first guide member 741a at the same time by the pressing member 756 so that the point of contact between the first member 752a and the first guide member 741a, the point of contact between the first member 752b and the first guide member 741a, and the point of contact between the second member 754 and the first guide member 741a are formed. Consequently, the movement of the sheet of paper P is conventionally regulated at the color measurement position X, as shown in FIG. 14, whereas in this embodiment, the movement of the sheet of paper P is regulated at upstream and downstream locations of the color measurement position X, as shown in FIG. 6, so that the variation in the angular orientation of the sheet of paper P that is associated with the conveyance of the sheet of paper P can be suppressed.

Second Embodiment

In the second embodiment, elements corresponding to the same elements in the first embodiment are given the same reference numerals and will not be described. In the second embodiment, the arrangement of the regulating member 751 is different from that of the first embodiment.

Figure 9:
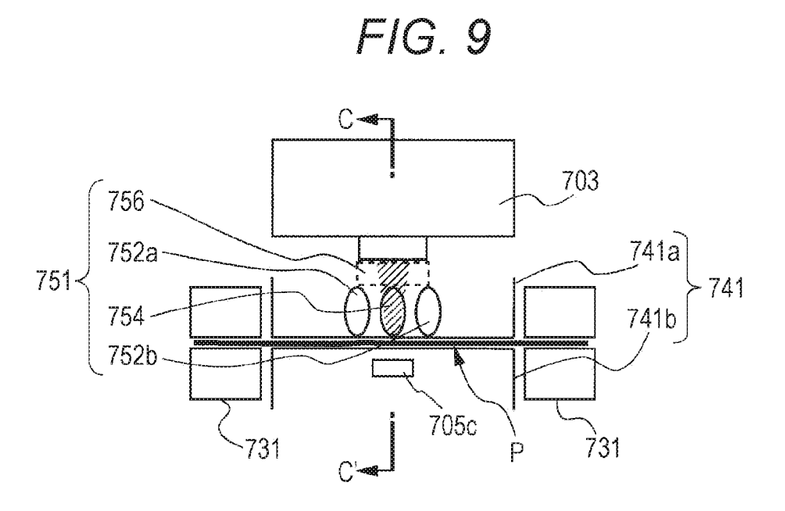
FIG. 9 is a front view of the guide member and the regulating member according to a second embodiment of the present invention.
Figure 10:
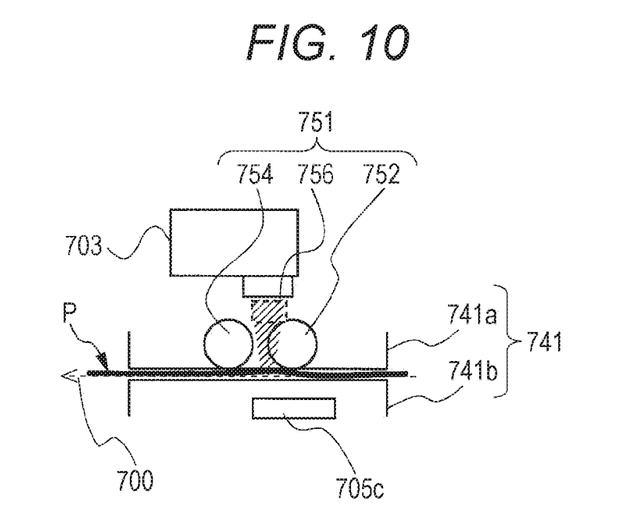
FIG. 10 is a cross-sectional view along the direction C-C' of the guide member and the regulating member according to the second embodiment of the present invention.
Figure 11:
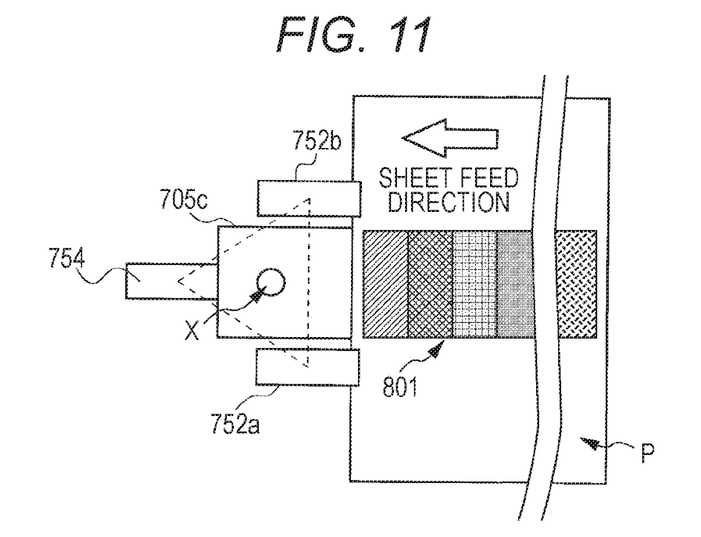
FIG. 11 is a plan view of the guide member and the regulating member according to the second embodiment of the present invention.

FIG. 9 is a front view of the guide member 741 and the regulating member 751 according to the second embodiment of the present invention. FIG. 10 is a cross-sectional view along the direction C-C' of the guide member 741 and the regulating member 751 according to the second embodiment of the present invention. FIG. 11 is a plan view of the guide member 741 and the regulating member 751 according to the second embodiment of the present invention.

As shown in FIGS. 9 to 11, the regulating member 751 is disposed opposite to the second guide member 741b. A fixed gap is formed between the second background member 705c and the second guide member 741b so as to prevent the sheet of paper P from rubbing against the second background member 705c.

That is, the regulating member 751 and the second guide member 741b are in an oppositely disposed relationship and the second guide member 741b and the second background member 705c are also in an oppositely disposed relationship. Thus, the first members 752 and the second member 754 can be pressed against the second guide member 741b at the same time by the pressing member 756 while deterioration of durability of the second background member 705c is improved.

Consequently, the variation in the angular orientation of the sheet of paper P that is associated with the conveyance of the sheet of paper P is suppressed due to the point of contact between the first members 752 and the second guide member 741b and the point of contact between the second member 754 and the second guide member 741b.

Specifically, the first members 752 and the second member 754 press the sheet of paper P at three points in the same direction as the direction of the light emitted from the colorimeter 703 to the color measurement position X. Thus, as in the first embodiment, the distance between the colorimeter 703 and the sheet of paper P and the distance between the sheet of paper P and the second background member 705c can be kept constant so that color measurement accuracy is improved.

While the image forming device 5 and the image reading device 7 according to the present invention have been described with reference to the embodiments, the present invention is not so limited and changes can be made without departing from the spirit of the invention.

For example, in the embodiments, an example arrangement has been described in which the sheet of paper P is conveyed horizontally and the colorimeter 703 and the second background member 705c are provided above and below the sheet of paper P, but the embodiments are not so limited. For example, an arrangement is also possible where the sheet of paper P is conveyed vertically and the colorimeter 703 and the second background member 705c are provided on the left and right of the sheet of paper P.

In the non-limiting example described, the image reading signal Sout is determined by the RGB color system as digital image data (RGB code) that includes R, G, and B color components. However, the image reading signal Sout may also be determined by a different color system such as a L*a*b* color system.

In the intermediate transfer unit 620, a non-limiting example using the secondary transfer roller 623 is described. However, for example, a configuration may be employed where a secondary transfer belt (not shown) is looped around a plurality of support rollers including the secondary transfer roller 623, that is, a belt-type secondary transfer unit.

In one non-limiting configuration, the colorimeter 703 performs color measurements based on an optical spectrum. However, for example, the colorimeter 703 may be a color and color difference meter that measures tristimulus values.

In one non-limiting arrangement, two of the first members 752 are provided. However, for example, an arrangement in which three or more of the first members 752 are provided may be employed.

In one non-limiting arrangement, one second member 754 is provided. However, for example, an arrangement in which two or more of the second members 754 are provided may be employed.

In one non-limiting example, the pressing member 756 includes a spring member. The pressing member 756 is not limiting, so long as it is a member that can bias the guide member 741. For example, the pressing member 756 may be configured to bias the guide member 741 such as by a cam (not shown) and a motor (not shown) that drives the cam.

Although the present invention has been described and illustrated in detail, it is clearly understood that the same is by way of illustrated and example only and is not to be taken byway of limitation, the scope of the present invention being interpreted by terms of the appended claims.

What is claimed is:

1. An image reading device comprising:
   a scanner configured to read an image formed on a sheet of paper;
   a first background member disposed opposite to the scanner and configured to reflect light emitted from the scanner;
   a colorimeter disposed downstream of the scanner and configured to take a color measurement of the image formed on the sheet of paper;
   a second background member disposed opposite to the colorimeter and configured to reflect light emitted from the colorimeter;
   a guide member disposed between the colorimeter and the second background member and configured to guide the sheet of paper passing between the colorimeter and the second background member; and
   a regulating member disposed opposite to the colorimeter and configured to regulate movement of the sheet of paper, wherein
   the regulating member includes:
      a first member disposed upstream of a color measurement position of the colorimeter and including a rolling member;
      a second member disposed downstream of the color measurement position of the colorimeter and including a rolling member; and
      a pressing member configured to press the first member and the second member against the guide member, and
   the pressing member is disposed in a position offset from axes of the first member and the second member.

2. The image reading device according to claim 1, wherein
   at least two of the first members are provided and disposed in positions deviated from a region passing through the color measurement position of the colorimeter of a region along a conveying direction of the sheet of paper.

3. The image reading device according to claim 2, wherein
   the at least two of the first members are disposed in opposition, and
   the at least one second member is disposed in the region passing through the color measurement position of the colorimeter of the region along the conveying direction of the sheet of paper.

4. The image reading device according to claim 1, wherein
   as the rolling member, each of the at least two first members and the at least one second member comprises a roller that rolls as the sheet of paper is conveyed.

5. The image reading device according to claim 1, wherein
   as the rolling member, each of the at least two first members and the at least one second member comprises a driving roller that conveys the sheet of paper.

6. The image reading device according to claim 1, wherein
   a load to press the at least two first members and the at least one second member against the guide member is adjustable according to stiffness of the sheet of paper.

7. The image reading device according to claim 1, wherein
   the guide member includes:
   a first guide member disposed opposite to the colorimeter and configured to guide the sheet of paper along the conveying direction of the sheet of paper; and
   a second guide member disposed opposite to the first guide member and configured to guide the sheet of paper along the conveying direction of the sheet of paper, and
   the regulating member is disposed opposite to the first guide member.

8. The image reading device according to claim 1, wherein
   the guide member includes:
   a first guide member disposed opposite to the colorimeter and configured to guide the sheet of paper along the conveying direction of the sheet of paper; and
   a second guide member disposed opposite to the first guide member and configured to guide the sheet of paper along the conveying direction of the sheet of paper, and
   the regulating member is disposed opposite to the second guide member.

9. The image reading device according to claim 1, wherein
   the scanner is provided in a position for reading an image formed on a front face of the sheet of paper and in a position for reading an image formed on a back face of the sheet of paper, and a reading result of the scanner is associated with a result of color measurement of the colorimeter.

10. An image forming system comprising:
the image reading device according to claim 1; and
an image forming device configured to form an image on the sheet of paper.

\* \* \* \* \*